(12) United States Patent
Moran et al.

(10) Patent No.: US 11,868,768 B2
(45) Date of Patent: Jan. 9, 2024

(54) DETECTING SECRETS IN SOURCE CODE

(71) Applicant: JPMorgan Chase Bank, N.A., New York, NY (US)

(72) Inventors: Sean Moran, Putney (GB); Ahmad Emami, New York, NY (US); Fanny Silavong, London (GB); Joachim Fainberg, Oslo (NO); Ashish Tiwari, Glasgow (GB); Antonios Georgiadis, London (GB); Bill Moriarty, West Chester, PA (US); Solomon Olaniyi Adebayo, Glasgow (GB); Georgios Papadopoulos, London (GB); Rohan Saphal, Glasgow (GB); Robert Falconer Keith, Cardross (GB); Rob Otter, Witham (GB); Stephen Hall, Fordingbridge (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 203 days.

(21) Appl. No.: 17/447,859

(22) Filed: Sep. 16, 2021

(65) Prior Publication Data
US 2023/0070420 A1 Mar. 9, 2023

(30) Foreign Application Priority Data
Sep. 8, 2021 (GR) .............................. 20210100589

(51) Int. Cl.
G06F 8/77 (2018.01)
G06F 8/75 (2018.01)
(Continued)

(52) U.S. Cl.
CPC ................ *G06F 8/77* (2013.01); *G06F 8/427* (2013.01); *G06F 8/75* (2013.01); *G06F 18/2148* (2023.01); *G06F 18/2185* (2023.01); *G06N 20/00* (2019.01)

(58) Field of Classification Search
CPC .................................. G06F 8/77; G06N 20/00
(Continued)

(56) References Cited

U.S. PATENT DOCUMENTS

| 7,937,243 B2 * | 5/2011 | Yen ........................ G06N 20/00 |
| | | 707/804 |
| 10,270,788 B2 * | 4/2019 | Faigon .................. G06F 21/554 |

(Continued)

OTHER PUBLICATIONS

Saha, Aakanksha, et al. "Secrets in source code: Reducing false positives using machine learning." 2020 International Conference on COMmunication Systems & NETworkS (COMSNETS). IEEE, 2020.pp.168-175 (Year: 2020).*

(Continued)

*Primary Examiner* — Satish Rampuria
(74) *Attorney, Agent, or Firm* — Greenblum & Bernstein, P.L.C.

(57) ABSTRACT

A method for facilitating identification of secrets in source code by using machine learning is provided. The method includes retrieving a plurality of files from a repository, each of the plurality of files including a source code file; parsing the source code file to identify a training feature; associating a predetermined label with the training feature, the predetermined label corresponding to a secret label and a non-secret label; training a model by using the training feature and the corresponding predetermined label; receiving, via a graphical user interface, a test file, the test file including a set of source codes; parsing the set of source codes to identify a feature; and determining, by using the model, a first characteristic of the feature.

18 Claims, 7 Drawing Sheets

(51) Int. Cl.
*G06N 20/00* (2019.01)
*G06F 8/41* (2018.01)
*G06F 18/214* (2023.01)
*G06F 18/21* (2023.01)

(58) Field of Classification Search
USPC .................................................. 717/100–120
See application file for complete search history.

(56) References Cited

U.S. PATENT DOCUMENTS

| 11,574,051 | B2* | 2/2023 | Yang ...................... G06N 3/045 |
| 2010/0007489 | A1* | 1/2010 | Misra ..................... G06Q 10/00 340/540 |
| 2020/0099663 | A1* | 3/2020 | Kapoor ............... G06F 21/6254 |
| 2020/0349259 | A1* | 11/2020 | Tsai ..................... G06F 21/562 |
| 2020/0351310 | A1* | 11/2020 | Leighton ................ G06N 20/00 |
| 2021/0150358 | A1* | 5/2021 | Lansel ................ G06F 21/6245 |

OTHER PUBLICATIONS

Feng, Runhan, et al. "Automated detection of password leakage from public GitHub repositories." Proceedings of the 44th International Conference on Software Engineering. 2022.pp.175-186 (Year: 2022).*

Medeiros, Ibéria, Nuno F. Neves, and Miguel Correia. "Automatic detection and correction of web application vulnerabilities using data mining to predict false positives." Proceedings of the 23rd international conference on World wide web. 2014.pp.63-73 (Year: 2014).*

Studiawan, Hudan, Ferdous Sohel, and Christian Payne. "Anomaly detection in operating system logs with deep learning-based sentiment analysis." IEEE Transactions on Dependable and Secure Computing 18.5 (2020): pp. 2136-2148. (Year: 2020).*

Jemal, Ines, et al. "Sql injection attack detection and prevention techniques using machine learning." International Journal of Applied Engineering Research 15.6 (2020): pp. 569-580. (Year: 2020).*

Bitton, Ron, and Asaf Shabtai. "A machine learning-based intrusion detection system for securing remote desktop connections to electronic flight bag servers." IEEE Transactions on Dependable and Secure Computing 18.3 (2019):pp. 1164-1181. (Year: 2019).*

* cited by examiner

DETECTING SECRETS IN SOURCE CODE

CROSS-REFERENCE TO RELATED APPLICATIONS

This application claims the benefit of Greek Provisional Patent Application No. 20210100589, filed Sep. 8, 2021, which is hereby incorporated by reference in its entirety.

BACKGROUND

1. Field of the Disclosure

This technology generally relates to methods and systems for source code analysis, and more particularly to methods and systems for facilitating automatic analysis of source codes by using machine learning to identify secret information.

2. Background Information

Many business entities utilize various software programs to provide services for consumers. Often, development of the software programs requires detailed source code analysis to ensure that secret and sensitive information are not inadvertently included in published products. Historically, implementation of conventional source code analysis techniques has resulted in varying degrees of success with respect to accurate and timely detection of the secret information.

One drawback of implementing conventional source code analysis techniques is that in many instances, the resulting data include many false positives. For example, a line of source code may be flagged as sensitive when there is no sensitive information present. As a result, developers must manually review positive detections, which requires large investments of time. Additionally, since secret information in a line of source code is traditionally flagged based on predetermined keywords, conventional source code analysis techniques are not able to anticipate and flexibly adjust to changing code environments.

Therefore, there is a need for an analysis technique that is based on machine learning to facilitate identification of secret information by efficiently and accurately analyzing large volumes of source codes.

SUMMARY

The present disclosure, through one or more of its various aspects, embodiments, and/or specific features or sub-components, provides, inter alia, various systems, servers, devices, methods, media, programs, and platforms for facilitating automatic analysis of source codes by using machine learning to identify secret information.

According to an aspect of the present disclosure, a method for facilitating identification of secrets in source code by using machine learning is provided. The method is implemented by at least one processor. The method may include retrieving a plurality of files from at least one repository, each of the plurality of files may include a source code file; parsing the source code file to identify at least one training feature; associating a predetermined label with each of the at least one training feature, the predetermined label may correspond to at least one from among a secret label and a non-secret label; training at least one model by using the at least one training feature and the corresponding predetermined label; receiving, via a graphical user interface, at least one test file, the at least one test file may include at least one set of source codes; parsing the at least one set of source codes to identify at least one feature; and determining, by using the at least one model, at least one first characteristic of the at least one feature.

In accordance with an exemplary embodiment, the method may further include determining, by using the at least one model, at least one second characteristic based on a first attribute of the at least one first characteristic, the at least one second characteristic may include at least one from among an obsolete characteristic, a usable characteristic, and a deprecated characteristic; and determining, by using the at least one model, at least one third characteristic based on a second attribute of the at least one second characteristic, the at least one third characteristic may include at least one from among a production characteristic and a development characteristic.

In accordance with an exemplary embodiment, the method may further include determining, by using the at least one model when the at least one third characteristic corresponds to the production characteristic, at least one fourth characteristic, the at least one fourth characteristic may include at least one production privilege level; and determining, by using the at least one model when the at least one third characteristic corresponds to the development characteristic, at least one fifth characteristic, the at least one fifth characteristic may include at least one development privilege level.

In accordance with an exemplary embodiment, the method may further include determining, by using the at least one model, at least one risk weighting value based on at least one from among the at least one first characteristic, the at least one second characteristic, the at least one third characteristic, the at least one fourth characteristic, and the at least one fifth characteristic; and assigning at least one severity level to the at least one feature based on the at least one risk weighting value.

In accordance with an exemplary embodiment, the method may further include automatically identifying, by using the at least one model, at least one course of action for the at least one feature based on the assigned at least one severity level and the corresponding at least one risk weighting value; initiating the at least one course of action; generating at least one new test file based on a result of the initiating; executing the at least one new test file to determine operability; and notifying, via the graphical user interface, at least one user, the notification may include information that relates to the at least one course of action, the assigned at least one severity level, the at least one new test file, and a result of the determined operability.

In accordance with an exemplary embodiment, the method may further include receiving, via the graphical user interface, at least one input, the at least one input including manual attestation data that corresponds to the at least one first characteristic; and retraining the at least one model by using the at least one input, the at least one model may include a machine learning model.

In accordance with an exemplary embodiment, the at least one training feature may include at least one from among a token feature, an entropy-based feature, a structural feature, and a file type feature.

In accordance with an exemplary embodiment, the predetermined label may include a weakly supervised label, the weakly supervised label may correspond to at least one from among a first label that results from regular expression patterns and a second label that results from distant supervision of at least one external knowledge base.

In accordance with an exemplary embodiment, the training may include optimizing at least one hyperparameter by using at least one validation set, the at least one hyperparameter may relate to the at least one training feature and the corresponding predetermined label.

In accordance with an exemplary embodiment, the at least one first characteristic may include at least one from among a secret characteristic and a non-secret characteristic, the secret characteristic may relate to information in the at least one set of source codes that is required to be hidden based on a business guideline.

According to an aspect of the present disclosure, a computing device configured to implement an execution of a method for facilitating identification of secrets in source code by using machine learning is disclosed. The computing device comprising a processor; a memory; and a communication interface coupled to each of the processor and the memory, wherein the processor may be configured to retrieve a plurality of files from at least one repository, each of the plurality of files may include a source code file; parse the source code file to identify at least one training feature; associate a predetermined label with each of the at least one training feature, the predetermined label may correspond to at least one from among a secret label and a non-secret label; train at least one model by using the at least one training feature and the corresponding predetermined label; receive, via a graphical user interface, at least one test file, the at least one test file may include at least one set of source codes; parse the at least one set of source codes to identify at least one feature; and determine, by using the at least one model, at least one first characteristic of the at least one feature.

In accordance with an exemplary embodiment, the processor may be further configured to determine, by using the at least one model, at least one second characteristic based on a first attribute of the at least one first characteristic, the at least one second characteristic may include at least one from among an obsolete characteristic, a usable characteristic, and a deprecated characteristic; and determine, by using the at least one model, at least one third characteristic based on a second attribute of the at least one second characteristic, the at least one third characteristic may include at least one from among a production characteristic and a development characteristic.

In accordance with an exemplary embodiment, the processor may be further configured to determine, by using the at least one model when the at least one third characteristic corresponds to the production characteristic, at least one fourth characteristic, the at least one fourth characteristic may include at least one production privilege level; and determine, by using the at least one model when the at least one third characteristic corresponds to the development characteristic, at least one fifth characteristic, the at least one fifth characteristic may include at least one development privilege level.

In accordance with an exemplary embodiment, the processor may be further configured to determine, by using the at least one model, at least one risk weighting value based on at least one from among the at least one first characteristic, the at least one second characteristic, the at least one third characteristic, the at least one fourth characteristic, and the at least one fifth characteristic; and assign at least one severity level to the at least one feature based on the at least one risk weighting value.

In accordance with an exemplary embodiment, the processor may be further configured to automatically identify, by using the at least one model, at least one course of action for the at least one feature based on the assigned at least one severity level and the corresponding at least one risk weighting value; initiate the at least one course of action; generate at least one new test file based on a result of the initiating; execute the at least one new test file to determine operability; and notify, via the graphical user interface, at least one user, the notification may include information that relates to the at least one course of action, the assigned at least one severity level, the at least one new test file, and a result of the determined operability.

In accordance with an exemplary embodiment, the processor may be further configured to receive, via the graphical user interface, at least one input, the at least one input may include manual attestation data that corresponds to the at least one first characteristic; and retrain the at least one model by using the at least one input, the at least one model may include a machine learning model.

In accordance with an exemplary embodiment, the at least one training feature may include at least one from among a token feature, an entropy-based feature, a structural feature, and a file type feature.

In accordance with an exemplary embodiment, the predetermined label may include a weakly supervised label, the weakly supervised label may correspond to at least one from among a first label that results from regular expression patterns and a second label that results from distant supervision of at least one external knowledge base.

In accordance with an exemplary embodiment, the training may include optimizing at least one hyperparameter by using at least one validation set, the at least one hyperparameter may relate to the at least one training feature and the corresponding predetermined label.

In accordance with an exemplary embodiment, the at least one first characteristic may include at least one from among a secret characteristic and a non-secret characteristic, the secret characteristic may relate to information in the at least one set of source codes that is required to be hidden based on a business guideline.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
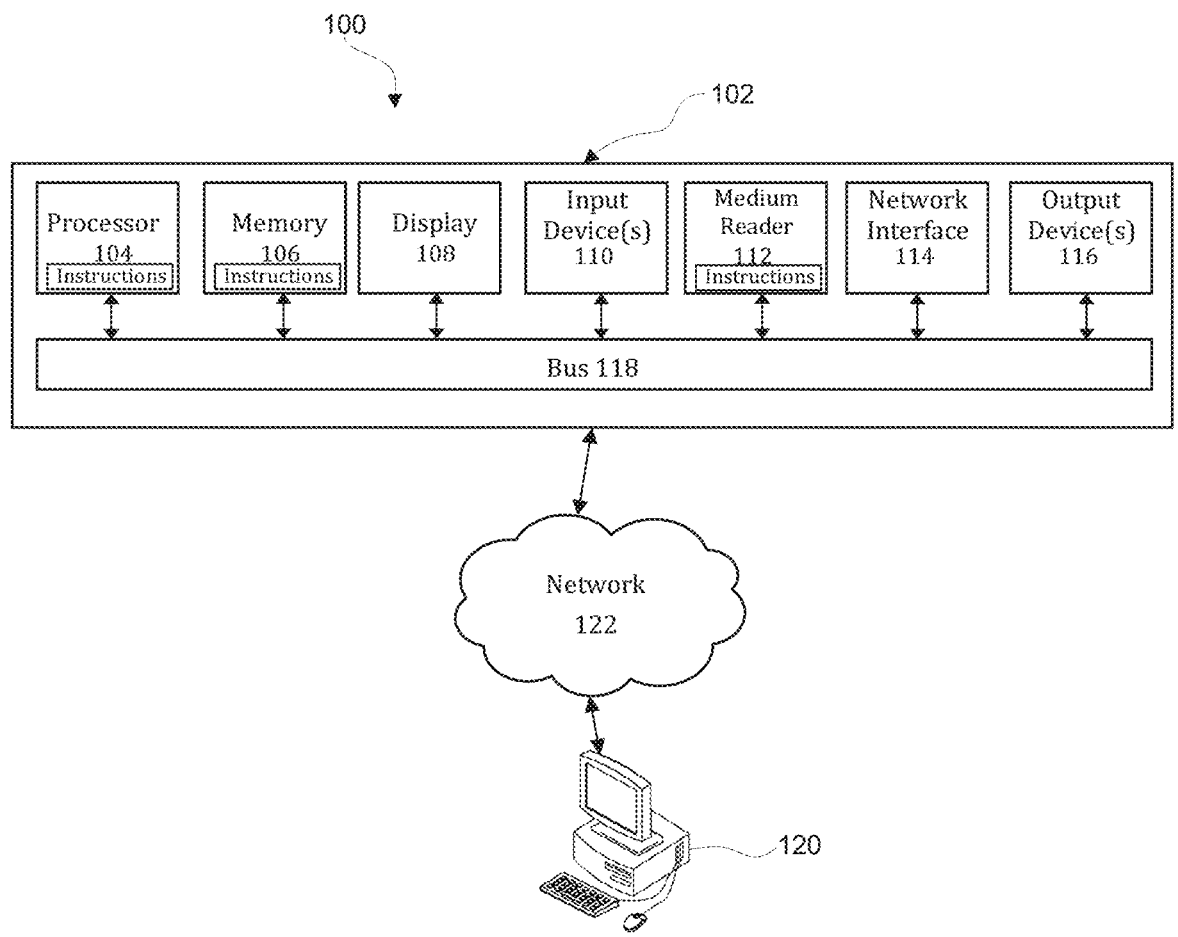
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automatic analysis of source codes by using machine learning to identify secret information.

Figure 2:
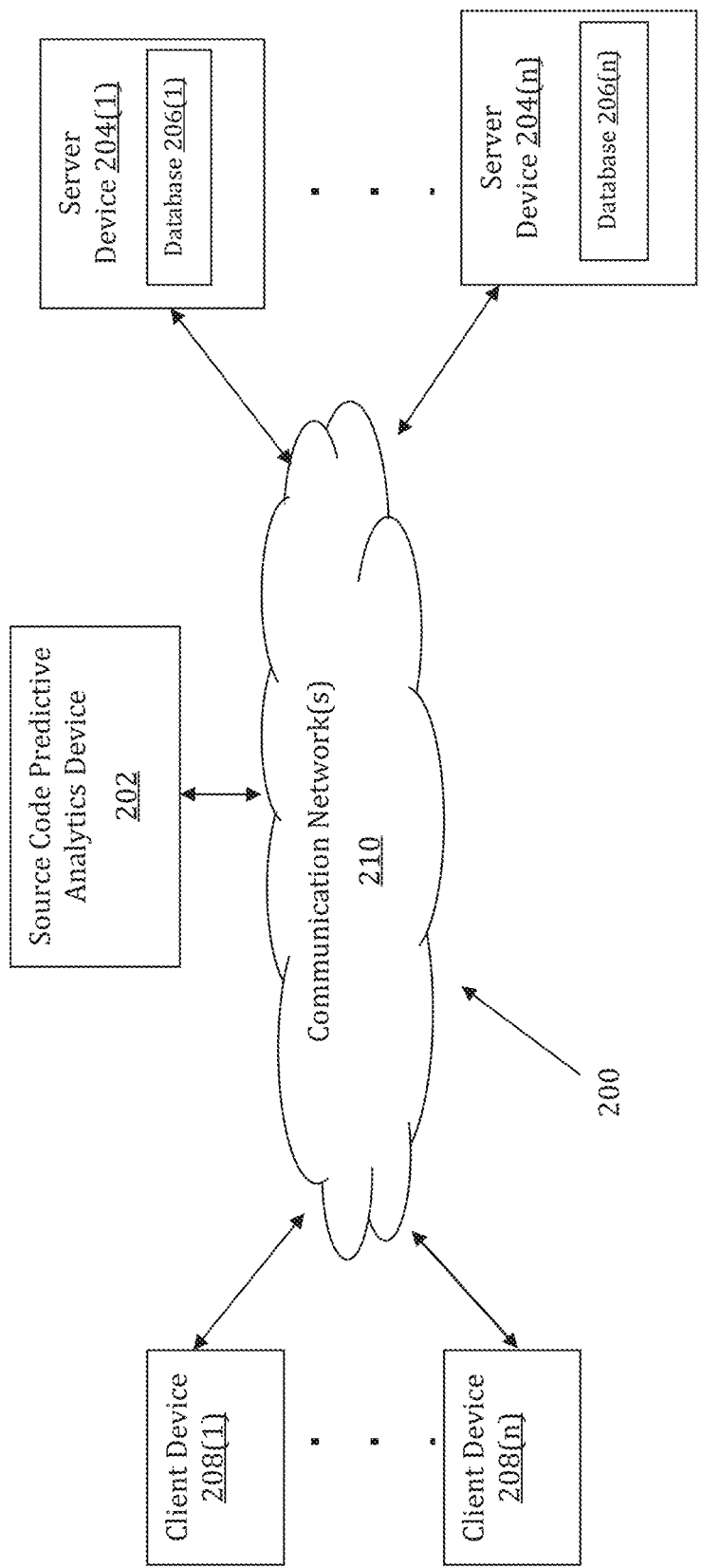
FIG. 2 illustrates an exemplary diagram of a network environment.

Referring to FIG. 2, a schematic of an exemplary network environment 200 for implementing a method for facilitating automatic analysis of source codes by using machine learning to identify secret information is illustrated. In an exemplary embodiment, the method is executable on any networked computer platform, such as, for example, a personal computer (PC).

The method for facilitating automatic analysis of source codes by using machine learning to identify secret information may be implemented by a Source Code Predictive Analytics (SCPA) device 202. The SCPA device 202 may be the same or similar to the computer system 102 as described with respect to FIG. 1. The SCPA device 202 may store one or more applications that can include executable instructions that, when executed by the SCPA device 202, cause the SCPA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SCPA device 202 itself, may be located in virtual server(s) running in a cloud-based computing environment rather than being tied to one or more specific physical network computing devices. Also, the application(s) may be running in one or more virtual machines (VMs) executing on the SCPA device 202. Additionally, in one or more embodiments of this technology, virtual machine(s) running on the SCPA device 202 may be managed or supervised by a hypervisor.

In the network environment 200 of FIG. 2, the SCPA device 202 is coupled to a plurality of server devices 204(1)-204(n) that hosts a plurality of databases 206(1)-206(n), and also to a plurality of client devices 208(1)-208(n) via communication network(s) 210. A communication interface of the SCPA device 202, such as the network interface 114 of the computer system 102 of FIG. 1, operatively couples and communicates between the SCPA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SCPA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SCPA devices that efficiently implement a method for facilitating automatic analysis of source codes by using machine learning to identify secret information.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SCPA device 202 may be a standalone device or integrated with one or more other devices or apparatuses, such as one or more of the server devices 204(1)-204(n), for example. In one particular example, the SCPA device 202 may include or be hosted by one of the server devices 204(1)-204(n), and other arrangements are also possible. Moreover, one or more of the devices of the SCPA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SCPA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to data files, source code files, predetermined labels, training features, secret labels, non-secret labels, machine learning models, test files, set of source codes, features, and characteristics.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SCPA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SCPA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SCPA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SCPA device 202, the server devices 204(1)-204(n), or the client devices 208(1)-208(n), for example, may be configured to operate as virtual instances on the same physical machine. In other words, one or more of the SCPA device 202, the server devices 204(1)-204(n), or the client devices 208(1)-208(n) may operate on the same physical device rather than as separate devices communicating through communication network(s) 210. Additionally, there may be more or fewer SCPA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
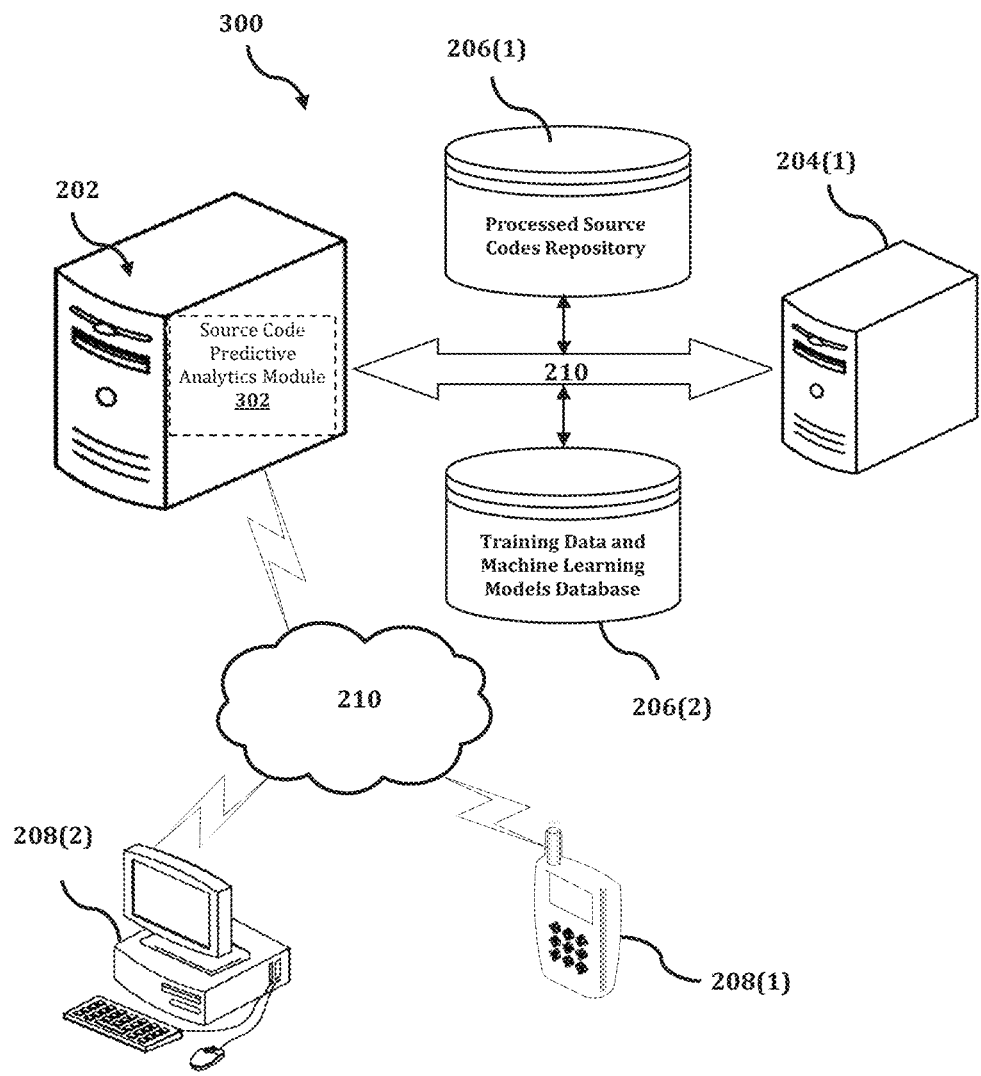
FIG. 3 shows an exemplary system for implementing a method for facilitating automatic analysis of source codes by using machine learning to identify secret information.

The SCPA device 202 is described and shown in FIG. 3 as including a source code predictive analytics module 302, although it may include other rules, policies, modules, databases, or applications, for example. As will be described below, the source code predictive analytics module 302 is configured to implement a method for facilitating automatic analysis of source codes by using machine learning to identify secret information.

An exemplary process 300 for implementing a mechanism for facilitating automatic analysis of source codes by using machine learning to identify secret information by utilizing the network environment of FIG. 2 is shown as being executed in FIG. 3. Specifically, a first client device 208(1) and a second client device 208(2) are illustrated as being in communication with SCPA device 202. In this regard, the first client device 208(1) and the second client device 208(2) may be "clients" of the SCPA device 202 and are described herein as such. Nevertheless, it is to be known and understood that the first client device 208(1) and/or the second client device 208(2) need not necessarily be "clients" of the SCPA device 202, or any entity described in association therewith herein. Any additional or alternative relationship may exist between either or both of the first client device 208(1) and the second client device 208(2) and the SCPA device 202, or no relationship may exist.

Further, SCPA device 202 is illustrated as being able to access a processed source codes repository 206(1) and a training data and machine learning models database 206(2). The source code predictive analytics module 302 may be configured to access these databases for implementing a method for facilitating automatic analysis of source codes by using machine learning to identify secret information.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SCPA device 202 via broadband or cellular communication. Of course, these embodiments are merely exemplary and are not limiting or exhaustive.

Upon being started, the source code predictive analytics module 302 executes a process for facilitating automatic analysis of source codes by using machine learning to identify secret information. An exemplary process for facilitating automatic analysis of source codes by using machine learning to identify secret information is generally indicated at flowchart 400 in FIG. 4.

Figure 4:
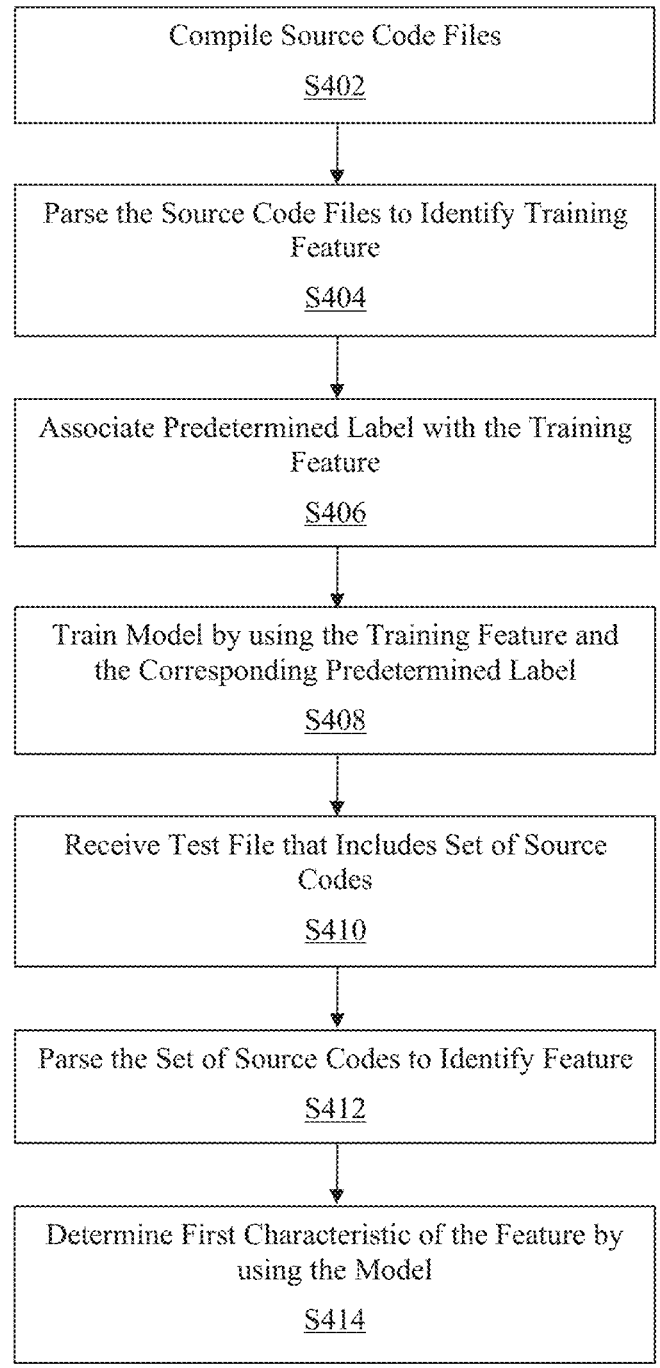
FIG. 4 is a flowchart of an exemplary process for implementing a method for facilitating automatic analysis of source codes by using machine learning to identify secret information.

In the process 400 of FIG. 4, at step S402, a plurality of files may be retrieved from a repository. Each of the plurality of files may include a source code file. In an exemplary embodiment, the repository may include source code files in any file type such as, for example, PYTHON files, C++ files, as well as configuration files. The source code may include any collection of codes that are written using a human-readable programming language. The source code of a program may be specifically designed to be used by computer programmers, who specify the actions to be performed by a computer via the source code. In another exemplary embodiment, each of the plurality of files may include a data file such as, for example, a configuration file, a read me file, a commit history file, a list dependencies present file, a database schemas file, a structured query language (SQL) file, etc.

At step S404, the source code file may be parsed to identify at least one training feature. In an exemplary embodiment, the source code file may be translated from a raw file format to a structured file format prior to parsing. The translation of the source code file may enable processing of various computing languages such that the parsing action is file type agnostic. In another exemplary embodiment, the source code file may be tokenized to facilitate structuring of the source code file. Tokenizing the source code may include demarcating and/or classifying sections of a line of source code based on a predetermined requirement. For example, a line of source code may be tokenized to remove unnecessary elements such as, for example, white spaces and formatting characters. In another exemplary embodiment, each line of the source code file may be transformed into a numeric feature vector that is usable to train a machine learning classification model to predict a classification for each line. The transformation of the source code file may include specific preprocessing steps such as, for example, replacing numbers with constants, splitting camel-case words, lowercasing alphabetic characters, and stripping accents.

In another exemplary embodiment, the training feature may include at least one from among a token feature, an entropy-based feature, a structural feature, and a file type feature. The token feature may correspond to a count of tokens in the detections, the entropy-based feature may correspond to how random the string of characters is, the structural features may correspond to a logical structure of methods in the source code, and the file type feature may correspond to a file type of the source code file. In another exemplary embodiment, the training feature may include a measurable property of a phenomenon. The training feature may include numeric, alphabetic, and symbolic characters that together comprise the source code file.

In another exemplary embodiment, the entropy-based feature may be computed based on password strength, entropy bits, and residual strength. The password strength may be computed by using a custom function to normalize entropy bits to a range such as, for example, 0 to 1, which starts linear and becomes gradually more non-linear as entropy bits increases compared to some predetermined threshold.

Moreover, the entropy bits may be computed based on the entire line input from the detected secret. The entropy bits may be a sub-feature to the strength as outlined above. The entropy bits may correspond to information entropy of a value such as, for example, a password in integers, or equivalently the log (base 2) of the number of possible passwords of that string, assuming a random selection process for each character.

Additionally, the residual strength may be computed based on a subset of the line from the detected secret. Since functions relating to strength and entropy bits are computed on the entire line, the functions often include text that are not actually part of the password. To resolve this, the residual strength function may first split the line into tokens by using a splitting logic. Then, tokens that already exists in a vocabulary may be filtered out resulting in creation of a new string of unseen tokens. The new string of unseen tokens, i.e., the residual string may then be computed to determine the strength consistent with disclosures in the present application.

At step S406, a predetermined label may be associated with the training feature. The predetermined label may correspond to at least one from among a secret label and a non-secret label. In an exemplary embodiment, the predetermined label may include a weakly supervised label. The weakly supervised label may correspond to at least one from among a first label that results from regular expression patterns and a second label that results from distant supervision of an external knowledge base. In another exemplary embodiment, the secret label may describe information in the source code that is required to be hidden based on a business guideline. For example, the information may include a password, an application programming interface (API) key, and a username.

At step S408, a model may be trained by using the training feature and the corresponding predetermined label. In an exemplary embodiment, the training may include optimizing a hyperparameter by using a validation set. The hyperparameter may relate to the training feature and the corresponding predetermined label. In another exemplary embodiment, the hyperparameter may correspond to a machine learning parameter whose value may be used to control the learning process. The hyperparameter may include a configuration that is external to the model and whose value may not be estimated from training data.

In another exemplary embodiment, the model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S410, a test file may be received via a graphical user interface. The test file may include a set of source codes. In an exemplary embodiment, the test file may include a software program in development that a developer submits for testing consistent with disclosures in the present application. For example, prior to publishing, the developer may interact with the graphical user interface to provide the software program for testing to determine whether secret information has been inadvertently added in the source code. In another exemplary embodiment, the test file may include a published software program that is currently in use. An administrator may interact with the graphical user interface to provide the published software program for testing. For example, as part of an auditing process, an administrator may select the published software program for further evaluation consistent with disclosures in the present application. In another exemplary embodiment, the test file may include a data file such as, for example, a configuration file, a read me file, a commit history file, a list dependencies present file, a database schemas file, a structured query language (SQL) file, etc.

At step S412, the set of source codes in the test file may be parsed to identify at least one feature. Consistent with disclosures in the present application, the set of source codes may be translated from a raw file format to a structured file format prior to parsing. The translation of the set of source codes may enable processing of various computing languages such that the parsing action is file type agnostic. In another exemplary embodiment, the source code file may be tokenized to facilitate structuring of the set of source codes. Tokenizing the set of source codes may include demarcating and/or classifying sections of a line of source code based on a predetermined requirement. For example, a line of source code may be tokenized to remove unnecessary elements such as, for example, white spaces and formatting characters. In another exemplary embodiment, the set of source codes may be transformed based on specific preprocessing steps such as, for example, replacing numbers with constants, splitting camel-case words, lowercasing alphabetic characters, and stripping accents.

Consistent with disclosures in the present application, the feature may include at least one from among a token feature, an entropy-based feature, a structural feature, and a file type feature. As will be appreciated by a person of ordinary skill in the art, the feature may include a measurable property of a phenomenon. The feature may include numeric, alphabetic, and symbolic characters that together comprise the set of source codes.

At step S414, a first characteristic of the feature may be determined by using the model. The first characteristic may be determined in real-time by using the model. In an exemplary embodiment, the first characteristic may include at least one from among a secret characteristic and a non-secret characteristic. The secret characteristic may relate to information in the set of source codes that is required to be hidden based on a business guideline. For example, the information may include a password, an application programming interface (API) key, and a username. In another exemplary embodiment, the first characteristic may relate to a binary classification of a token that corresponds to the feature.

In another exemplary embodiment, a second characteristic of the feature may be determined by using the model. The second characteristic may be determined based on a first attribute of the first characteristic. The second characteristic may include at least one from among an obsolete characteristic, a usable characteristic, and a deprecated characteristic. For example, when a probability is high enough that a first characteristic is a secret characteristic, then the potential secret characteristic is passed to a second classifier that determines whether the secret characteristic is obsolete, usable, and/or deprecated.

In another exemplary embodiment, a third characteristic of the feature may be determined by using the model. The third characteristic may be determined based on a second attribute of the second characteristic. The third characteristic may include at least one from among a production characteristic and a development characteristic. For example, when the secret characteristic is deemed usable with a sufficiently high probability, then a third classifier may be used to detect whether the line of source code is a production or a non-production secret.

In another exemplary embodiment, a fourth characteristic of the feature may be determined by using the model. The fourth characteristic may be determined by the model when the third characteristic corresponds to the production characteristic. The fourth characteristic may include a production privilege level such as, for example, a low level or a high level. For example, when the secret characteristic is a production secret with a sufficiently high probability, then a fourth classifier may be used to determine the level of privilege that pertains to the secret in the production environment.

In another exemplary embodiment, a fifth characteristic of the feature may be determined by using the model. The fifth characteristic may be determined by the model when the third characteristic corresponds to the development characteristic. The fifth characteristic may include a development privilege level such as, for example, a low level or a high level. For example, when the secret characteristic is a development environment secret with a sufficiently high probability, then a fifth classifier may be used to determine the level of privilege that pertains to the secret in the development environment.

In another exemplary embodiment, a risk weighting value may be determined by using the model. The risk weighting value may be determined based on at least one from among the first characteristic, the second characteristic, the third characteristic, the fourth characteristic, and the fifth characteristic. Then, a severity level may be assigned to the feature based on the determined risk weighting value. For example, the secret characteristic may be assigned a risk weighting value depending on where the feature ends up with respect to leaf nodes of a probability tree. When the secret is production with a high privilege, the risk weighting value may be highest, i.e., a severe value. When the secret is a low privilege development secret, the risk weighting value may be low, i.e., a low value. When the feature is non-secret, the risk weighting value may be the lowest value, i.e., a baseline value.

In another exemplary embodiment, a course of action for the feature may be automatically identified. The course of action may be automatically identified by using the model based on the assigned severity level and the corresponding risk weighting value. For example, the detections from the classifier may be automatically resolved based on a human-in-the-loop implementation. The identified course of action may be automatically initiated, and a new test file may be automatically generated based on a result of the initiating. The new test file may then be executed to determine whether the new test file is operable. For example, a pull request may be automatically created to execute a build test and/or a unit test on the new test file to ensure that breaking changes are not made by the identified course of action. Then, a user may be notified via the graphical user interface. In another exemplary embodiment, the notification may include information that relates to the identified course of action, the assigned severity level, the new test file, and a result of the determined operability. For example, a developer may be emailed to request approval for the pull request.

In another exemplary embodiment, an input from the user may be received via the graphical user interface. The input may include manual attestation data that corresponds to one of the characteristics of the feature. Then, the model may be retrained by using the received input. Consistent with disclosures in the present application, the model may include at least one from among a machine learning model, a statistical model, a mathematical model, a process model, and a data model.

Figure 5:
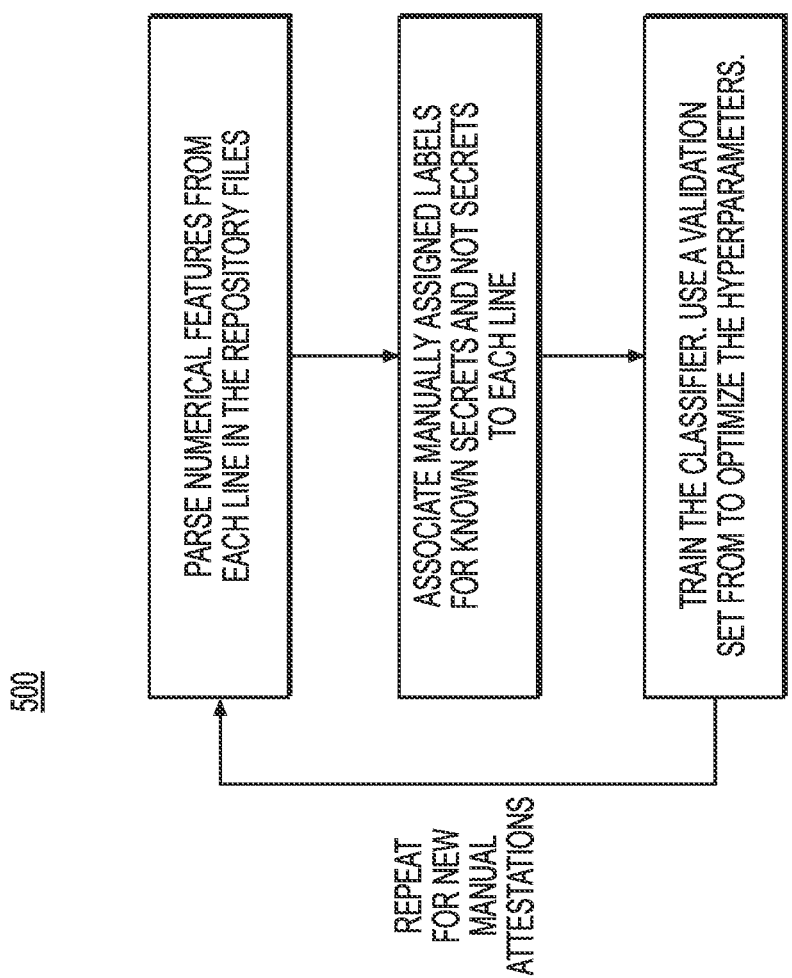
FIG. 5 is a process flow of an exemplary training process for implementing a method for facilitating automatic analysis of source codes by using machine learning to identify secret information.

FIG. 5 is a process flow 500 of an exemplary training process for implementing a method for facilitating automatic analysis of source codes by using machine learning to identify secret information. In FIG. 5, the exemplary training process may be used to train a machine learning model consistent with disclosures in the present application. As illustrated in FIG. 5, numerical features from each line in the repository files may be parsed. Then, manually assigned labels for known secrets and non-secrets may be associated to each line of source code. The numerical features and the associated labels may be used to train the classifier. A validation set may be used in the training process to optimize the hyperparameters. The training process may be repeated for new manual attestations consistent with disclosures in the present application.

Figure 6:
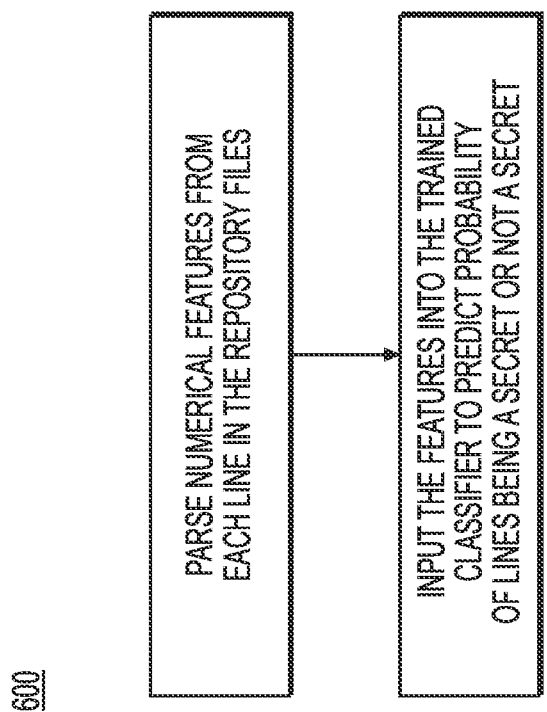
FIG. 6 is a process flow of an exemplary inference process for implementing a method for facilitating automatic analysis of source codes by using machine learning to identify secret information.

FIG. 6 is a process flow 600 of an exemplary inference process for implementing a method for facilitating automatic analysis of source codes by using machine learning to identify secret information. In FIG. 6, the exemplary inference process may be used to infer whether a feature is a secret consistent with disclosures in the present application. As illustrated in FIG. 6, numerical features may be parsed from each line in the repository file. The numerical features may then be used as input for the trained classifier. The trained classifier may use the numerical features to predict a probability that source code lines correspond to a secret.

Figure 7:
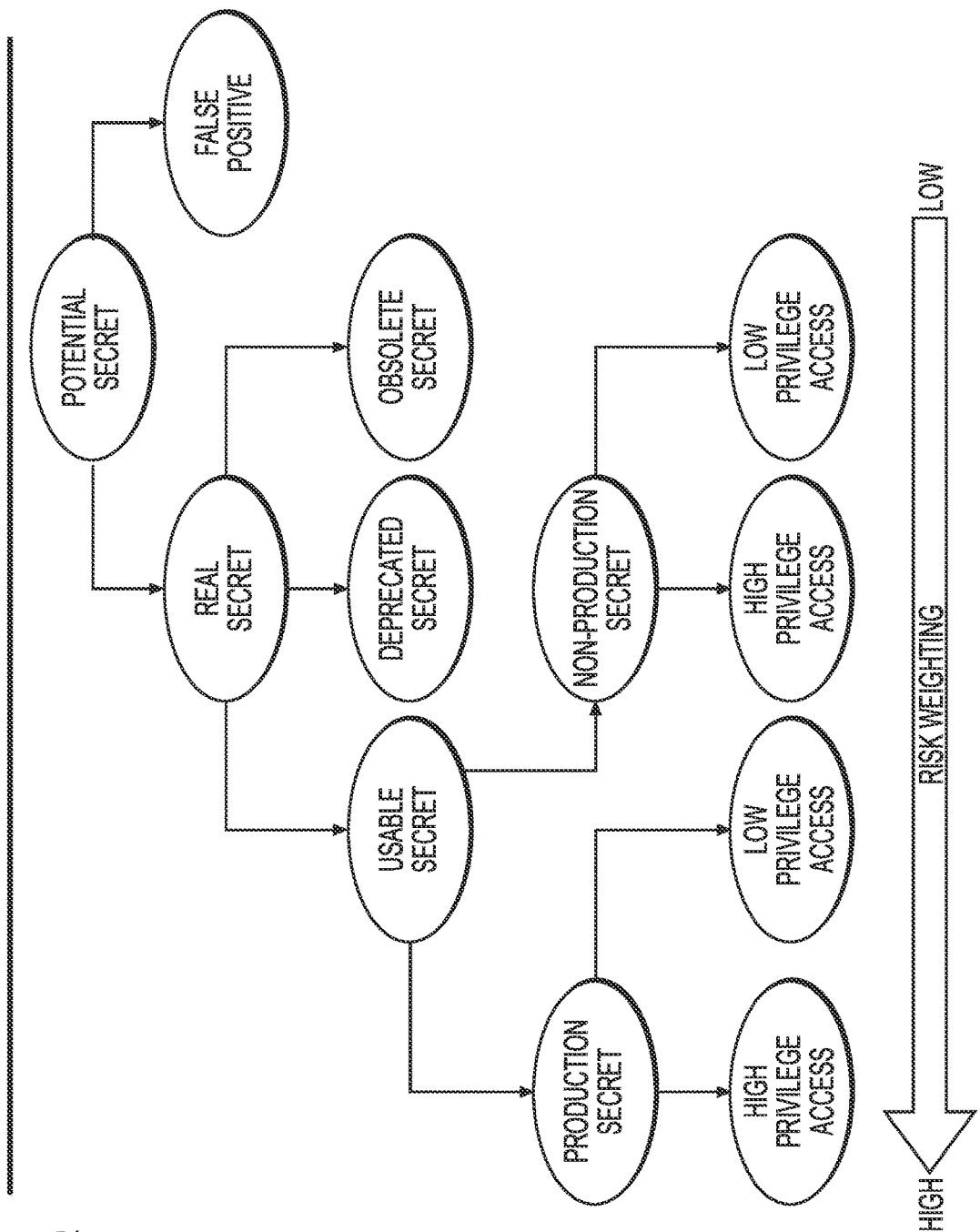
FIG. 7 is a probability tree of an exemplary risk weighting process for implementing a method for facilitating automatic analysis of source codes by using machine learning to identify secret information.

FIG. 7 is a probability tree 700 of an exemplary risk weighting process for implementing a method for facilitating automatic analysis of source codes by using machine learning to identify secret information. In FIG. 7, the probability tree may be used to grade the severity of the secret based on an operating environment of the source code.

As illustrated in FIG. 7, each leaf node in the probability tree correspond to a potential state of the secret. The potential state of the secret may correspond to whether the secret is a real secret or a false positive, whether the real secret is a usable secret, a deprecated secret, or an obsolete secret, whether the usable secret is a production secret or a non-production secret, whether the production secret is high privilege access or low privilege access, as well as whether the non-production secret is high privilege access or low privilege access. In another exemplary embodiment, a predetermined threshold may determine whether a line proceeds down the probability tree to the next leaf node.

Accordingly, with this technology, an optimized process for facilitating automatic analysis of source codes by using machine learning to identify secret information is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating identification of secrets in source code by using machine learning, the method being implemented by at least one processor, the method comprising:
   retrieving, by the at least one processor, a plurality of files from at least one repository, each of the plurality of files including a source code file;
   parsing, by the at least one processor, the source code file to identify at least one training feature;
   associating, by the at least one processor, a predetermined label with each of the at least one training feature, the predetermined label corresponding to at least one from among a secret label and a non-secret label;
   training, by the at least one processor, at least one model by using the at least one training feature and the corresponding predetermined label;
   receiving, by the at least one processor via a graphical user interface, at least one test file, the at least one test file including at least one set of source codes;
   parsing, by the at least one processor, the at least one set of source codes to identify at least one feature;
   determining, by the at least one processor using the at least one model, at least one first characteristic of the at least one feature;
   determining, by the at least one processor using the at least one model, at least one second characteristic based on a first attribute of the at least one first characteristic, the at least one second characteristic including at least one from among an obsolete characteristic, a usable characteristic, and a deprecated characteristic; and
   determining, by the at least one processor using the at least one model, at least one third characteristic based on a second attribute of the at least one second characteristic, the at least one third characteristic including at least one from among a production characteristic and a development characteristic.

2. The method of claim 1, further comprising:
   determining, by the at least one processor using the at least one model when the at least one third characteristic corresponds to the production characteristic, at least one fourth characteristic, the at least one fourth characteristic including at least one production privilege level; and
   determining, by the at least one processor using the at least one model when the at least one third characteristic corresponds to the development characteristic, at least one fifth characteristic, the at least one fifth characteristic including at least one development privilege level.

3. The method of claim 2, further comprising:
   determining, by the at least one processor using the at least one model, at least one risk weighting value based on at least one from among the at least one first characteristic, the at least one second characteristic, the at least one third characteristic, the at least one fourth characteristic, and the at least one fifth characteristic; and
   assigning, by the at least one processor, at least one severity level to the at least one feature based on the at least one risk weighting value.

4. The method of claim 2, further comprising:
   automatically identifying, by the at least one processor using the at least one model, at least one course of action for the at least one feature based on the assigned at least one severity level and the corresponding at least one risk weighting value;
   initiating, by the at least one processor, the at least one course of action;
   generating, by the at least one processor, at least one new test file based on a result of the initiating;
   executing, by the at least one processor, the at least one new test file to determine operability; and
   notifying, by the at least one processor via the graphical user interface, at least one user, the notification including information that relates to the at least one course of action, the assigned at least one severity level, the at least one new test file, and a result of the determined operability.

5. The method of claim 1, further comprising:
   receiving, by the at least one processor via the graphical user interface, at least one input, the at least one input including manual attestation data that corresponds to the at least one first characteristic; and
   retraining, by the at least one processor, the at least one model by using the at least one input, the at least one model including a machine learning model.

6. The method of claim 1, wherein the at least one training feature includes at least one from among a token feature, an entropy-based feature, a structural feature, and a file type feature.

7. The method of claim 1, wherein the predetermined label includes a weakly supervised label, the weakly supervised label corresponding to at least one from among a first label that results from regular expression patterns and a second label that results from distant supervision of at least one external knowledge base.

8. The method of claim 1, wherein the training includes optimizing at least one hyperparameter by using at least one validation set, the at least one hyperparameter relating to the at least one training feature and the corresponding predetermined label.

9. The method of claim 1, wherein the at least one first characteristic includes at least one from among a secret characteristic and a non-secret characteristic, the secret characteristic relating to information in the at least one set of source codes that is required to be hidden based on a business guideline.

10. A computing device configured to implement an execution of a method for facilitating identification of secrets in source code by using machine learning, the computing device comprising:
    a processor;
    a memory; and
    a communication interface coupled to each of the processor and the memory,
    wherein the processor is configured to:
       retrieve a plurality of files from at least one repository, each of the plurality of files including a source code file;
       parse the source code file to identify at least one training feature;
       associate a predetermined label with each of the at least one training feature, the predetermined label corresponding to at least one from among a secret label and a non-secret label;
       train at least one model by using the at least one training feature and the corresponding predetermined label;
       receive, via a graphical user interface, at least one test file, the at least one test file including at least one set of source codes;
       parse the at least one set of source codes to identify at least one feature;

determine, by using the at least one model, at least one first characteristic of the at least one feature;

determine, by using the at least one model, at least one second characteristic based on a first attribute of the at least one first characteristic, the at least one second characteristic including at least one from among an obsolete characteristic, a usable characteristic, and a deprecated characteristic; and determine, by using the at least one model, at least one third characteristic based on a second attribute of the at least one second characteristic, the at least one third characteristic including at least one from among a production characteristic and a development characteristic.

11. The computing device of claim 10, wherein the processor is further configured to:

determine, by using the at least one model when the at least one third characteristic corresponds to the production characteristic, at least one fourth characteristic, the at least one fourth characteristic including at least one production privilege level; and determine, by using the at least one model when the at least one third characteristic corresponds to the development characteristic, at least one fifth characteristic, the at least one fifth characteristic including at least one development privilege level.

12. The computing device of claim 11, wherein the processor is further configured to:

determine, by using the at least one model, at least one risk weighting value based on at least one from among the at least one first characteristic, the at least one second characteristic, the at least one third characteristic, the at least one fourth characteristic, and the at least one fifth characteristic; and assign at least one severity level to the at least one feature based on the at least one risk weighting value.

13. The computing device of claim 12, wherein the processor is further configured to:

automatically identify, by using the at least one model, at least one course of action for the at least one feature based on the assigned at least one severity level and the corresponding at least one risk weighting value;

initiate the at least one course of action;

generate at least one new test file based on a result of the initiating;

execute the at least one new test file to determine operability; and notify, via the graphical user interface, at least one user, the notification including information that relates to the at least one course of action, the assigned at least one severity level, the at least one new test file, and a result of the determined operability.

14. The computing device of claim 10, wherein the processor is further configured to:

receive, via the graphical user interface, at least one input, the at least one input including manual attestation data that corresponds to the at least one first characteristic; and retrain the at least one model by using the at least one input, the at least one model including a machine learning model.

15. The computing device of claim 10, wherein the at least one training feature includes at least one from among a token feature, an entropy-based feature, a structural feature, and a file type feature.

16. The computing device of claim 10, wherein the predetermined label includes a weakly supervised label, the weakly supervised label corresponding to at least one from among a first label that results from regular expression patterns and a second label that results from distant supervision of at least one external knowledge base.

17. The computing device of claim 10, wherein the training includes optimizing at least one hyperparameter by using at least one validation set, the at least one hyperparameter relating to the at least one training feature and the corresponding predetermined label.

18. The computing device of claim 10, wherein the at least one first characteristic includes at least one from among a secret characteristic and a non-secret characteristic, the secret characteristic relating to information in the at least one set of source codes that is required to be hidden based on a business guideline.

* * * * *